United States Patent Office 3,237,020
Patented Feb. 22, 1966

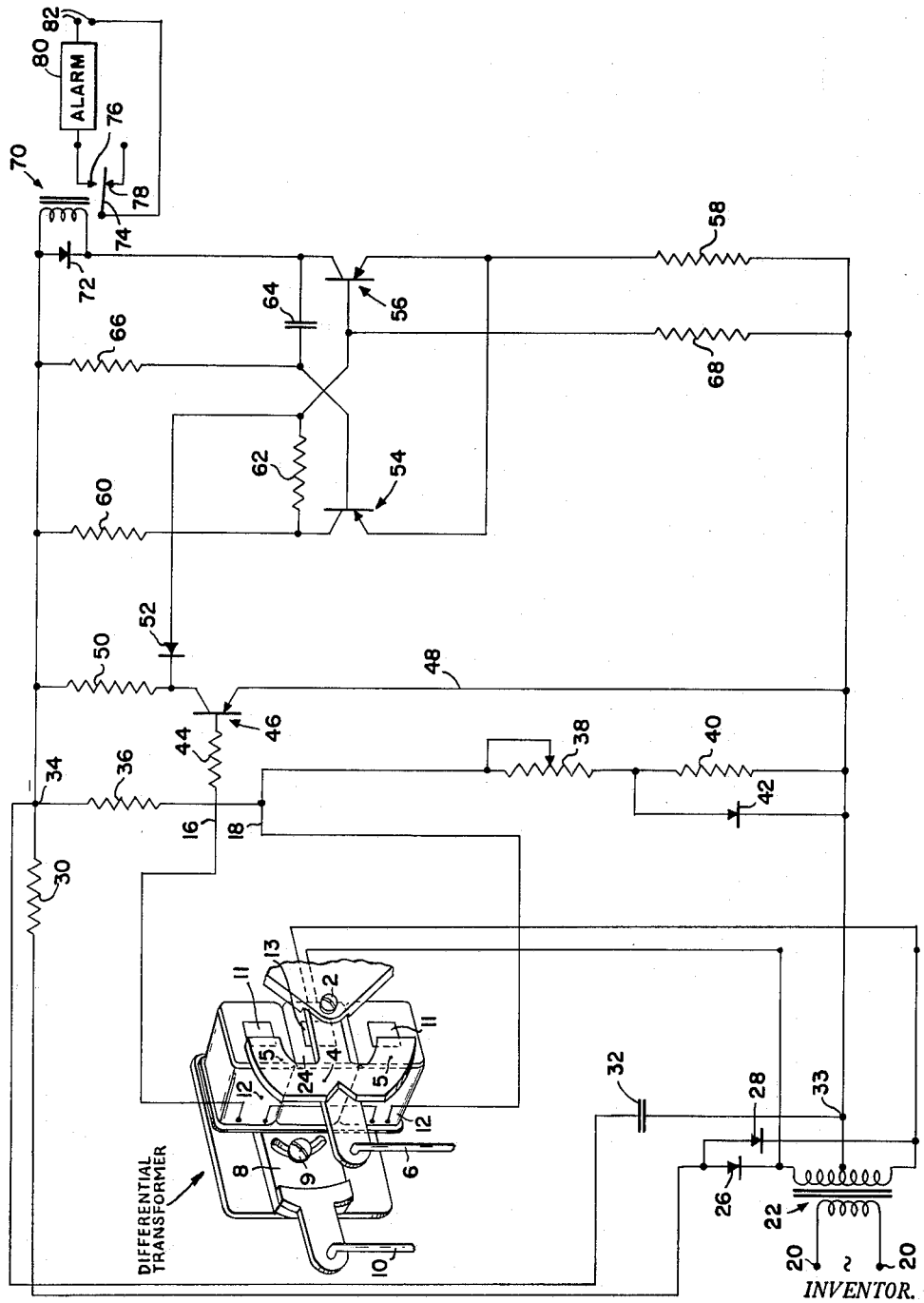

3,237,020
ALARM APPARATUS EMPLOYING A MONO-
STABLE MULTIVIBRATOR THAT RETAINS
ITS ASTABLE STATE LONGER THAN AN
INPUT CYCLE
Prathivadhi Bayankaram Krishnaswamy, Hatboro, Pa.,
assignor to Fischer & Porter Company, Warminster,
Pa., a corporation of Pennsylvania
Filed July 21, 1961, Ser. No. 125,877
4 Claims. (Cl. 307—88.5)

This invention relates to alarm apparatus, using that term in the general sense of apparatus which is adapted to provide a visual or audible alarm, or to effect a control operation such as of a mechanical stop motion, valves, fire extinguishing devices, or the like. The invention is particularly adapted for use in conjunction with measuring apparatus.

Many instances arise in which excursions of measurements of a variable beyond predetermined limiting values should provide signals either in the form of warnings or for control of special operations, such as those of shutting down a process or mechanism, initiating safety steps, or the like. Desirably such an "alarm" device, associated with a measuring instrument, should be adapted to adjustment as to both end points of measurement at which signals should be initiated. Stated in another way, this means that adjustments of a dead band in which signals are not emitted or initiated should be susceptible to range adjustment while at the same time the band should be adjustable as to its position in the full range of measurement. As will be evident, the dual adjustments for band width and band location serve to provide for arbitrary adjustment of the dead band end points, within the range of the apparatus.

The general object of the invention is the provision of apparatus of the type just indicated. A further object is to provide an apparatus which, though alternating current operated, and though involving pulsing action, will provide for stable operation of a relay. Further objects of the invention are concerned with the production of an apparatus of this type which has high temperature stability and high insensitivity to line voltage variations so that, despite the disturbing factors, settings once made effect the desired controls reliably.

These and other objects of the invention particularly relating to details of construction and operation will become apparent from the following description, read in conjunction with the accompanying drawing, in which the figure shows in diagrammatic form the associated mechanical and electrical elements of a preferred embodiment of the invention.

A mounting frame provides a pivot 2 for a movable armature 4 having end extensions 5. A link 6 is provided to connect this armature to a movable element of a measuring or similar instrument so that during the measuring operation of the latter the armature is rocked about its pivot. The measuring instrument may be of any type, electrical, pneumatic, hydraulic, or the like, providing a motion transmitted through the link 6. Mounted on a pivot in the frame which is not shown but which is coaxial with the pivot 2 is a movable base 8 which may be clamped in adjusted position by a screw 9. For convenience of adjustment, this may be connected by a link 10 to a set point spindle or other adjustable element of the measuring instrument. As will be evident hereafter, this may be regarded as setting the position of a dead band with respect to the scale of measurement. The base 8 carries the E-shaped core of a differential transformer, the end legs 11 of which are adjacent the paths of movement of the ends 5 of the armature, while the central leg 13 is located adjacent to the pivot 2 and the portion of the armature hereat. Windings 12 on the outer legs of the transformer core are joined in series between the output leads 16 and 18. The coils are connected in the usual fashion so that, when symmetry of the core system including the armature 4 exists the induced signals in these coils are in opposition to provide a net zero output to the lines 16 and 18.

Input power supply terminals are indicated at 20 and receive current from the commercial alternating supply line. A transformer 22 provides a suitable voltage for operation, the voltage used depending upon the components hereafter described. The terminals of the secondary of the transformer 22 supply excitation to the winding 24 surrounding the central pole 13 of the differential transformer. Additionally the secondary of the transformer conveniently supplies a direct potential source for the remainder of the control system, full wave rectification being provided by the diodes 26 and 28, and filtering being supplied by the resistor 30 and capacitor 32 returning to the center tap 33 of the secondary which constitutes the reference "ground" for the system. A direct negative power supply terminal is thus provided at 34.

A voltage divider is provided by the series resistors 36, 38 and 40 returning to the terminal 33 from the negative terminal 34. The resistor 38 is adjustable and provides an adjustable bias for the base of a transistor 46. Shunting the resistor 40 is a diode 42, which in conjunction with the resistor 40 provides temperature compensation to maintain operating settings despite large temperature variations. The junction of resistors 36 and 38 is connected to the line 18 while the line 16 is connected through resistor 44 to the base of the transistor 46, which has its emitter returned to the reference terminal 33 through connection 48, and has its collector connected through load resistor 50 to terminal 34. Values of the parameters are so chosen that when no signal appears between the lines 16 and 18 the amplifier stage constituted by transistor 46 is driven to saturation, a maximum collector current then flowing.

The collector of transistor 46 is connected through diode 52 to a monostable multivibrator which comprises the transistors 54 and 56 in a conventional arrangement in which the emitters are connected to the reference terminal through resistor 58. The collector of transistor 54 is connected to the negative supply terminal 34 through resistor 60, and is connected through resistor 62 to the base of transistor 56 which is also connected to the anode of the diode 52. A capacitor 64 connects the collector of transistor 56 to the base of transistor 54 which is also connected through the resistor 66 to the terminal 34. The base of transistor 56 is connected to the reference terminal through resistor 68. The winding of the relay 70 is connected between the collector of transistor 56 and terminal 34 and is shunted by a diode 72 which smooths its operation. The movable armature 74 of relay 70 may be connected in any suitable fashion to provide an output actuating an alarm or effecting control as of a mechanical stop motion, valves, or the like. As specifically illustrated, when the relay is energized the armature is arranged to engage a contact 76 closing a circuit through an alarm 80 from supply terminals 82 which may be supplied with line current. A contact 78 may be energized to perform any desired function when the relay is deenergized.

The operation of what has been described is as follows:

Referring first to the monostable multivibrator, circuit constants are so chosen, in usual fashion, so that the transistor 54 is normally on (conducting) and the transistor 56 is normally off (non-conducting). The normal condition, then, is that of deenergization of the relay 70. The resistor 62 and capacitor 64, and the other parameters, are so chosen that when the monostable multivibrator is thrown to its astable state by a pulse through the diode 52 it will remain in that state for a time exceeding the period of a cycle of the alternating supply; in fact, most desirably for a time exceeding many cycles thereof. As will shortly appear, this leads to stable operation.

Assuming a particular setting of the resistor 38 which controls the bias on the base of transistor 46, this transistor, in the absence of signals from the lines 16 and 18 will be in a saturated condition and a heavy current will flow through resistor 50 producing at the anode of diode 52 a high positive potential relative to the terminal 34. The condition of no signals through the lines 16 and 18 is the result of location of the armature 4 symmetrically with respect to the poles 11 of the differential transformer, the potentials induced in the windings 12 then being equal and bucking each other.

Assume, now, that the armature 4 is displaced from its symmetrical position. The balance condition is then disturbed and an alternating potential having a value corresponding to the displacement will appear at the lines 16 and 18. When a negative half cycle is thus applied to the base of transistor 46 it will be driven in a direction which, if anything occurs, would tend to more fully saturate the transistor. A negative half cycle thus produces no effective result, any increase in positive potential at the cathode of diode 52 being blocked by the diode from application to the multivibrator. A positive half cycle appearing on line 16 will have no effect unless its magnitude is sufficient to overcome the bias which holds the transistor in saturated condition. However, if the positive half cycle does exceed this bias the transistor is driven out of saturated condition and by reason of the reduction of current through resistor 50 a negative pulse is produced at the collector which is transmitted through the diode 52 to the base of transistor 56 with the result of throwing the multivibrator to its astable state in which the transistor 56 becomes conductive with resulting energization of the relay 70 and sounding of the alarm or other operation controlled by the relay. As already pointed out, the constants of the multivibrator are so chosen that its return to its stable state is delayed for a period exceeding the period of the alternating cycle. A negative half cycle appearing at line 16, again driving the transistor 46 to saturated condition has no effect, the resulting positive pulse appearing at the collector of transistor 46 being blocked by diode 52. The next positive half cycle appearing at line 16 produces a negative pulse through diode 52, but so long as the multivibrator remains in its astable state, i.e., transistor 56 conducting, such a negative pulse will have no effect. The multivibrator is not, however, restored, in effect, to the beginning of its astable state by new negative pulses, but returns to its stable state at the end of a time depending on its RC circuit. Following its return, however, it is again flipped to its astable state by the next negative pulse. A transient condition thus results which involves the return of the multivibrator to its stable state but for no more than the period of the alternating current supply. Considering, however, the delay in the relay operation enhenced by the provision of diode 72, this transient condition will not cause the relay to release its contact. The relay 70 continues energized (except for the transient conditions stated) until, by reason of change of the alternating potential between lines 16 and 18, the positive half cycles become ineffective to overcome the bias to drive the transistor 46 out of saturation. When this condition occurs, the multivibrator will return to its stable state, cutting off the current through relay 70.

It will be noted that in the operation described above the events will occur irrespective of which phase of the exciting current of the differential transformer produces the active positive pulses on line 16. Accordingly, a movement of armature 4 in either direction will produce the same results.

It will now be evident that the adjustment of the bias by adjustment of resistor 38 will determine the dead band width within which relay operation is not to occur but outside of which it is to occur. By increasing the bias which drives the transistor 26 into saturation there will be correspondingly increased the amplitude of the alternating potential between lines 16 and 18 necessary to drive the transistor out of saturation to trip the multivibrator. This potential is, in turn, dependent upon the deviation of the position of armature 4 from symmetry relative to the differential transformer poles 11. Thus the width of the dead band is adjustable by manipulation of the control of resistance value 38. In a typical apparatus of the type described this adjustment was capable of setting the dead band width from 0.1% to 14% of full scale of the measuring instrument.

The location of the dead band within the measuring scale is adjusted by changing the position of the base 8 carrying the E-core of the differential transformer, thus shifting the position at which the armature 4 is symmetrically related thereto. The dead band may thus be set anywhere within the measuring range or overlapping its extreme regions to produce unilateral rather than bilateral control of the alarm or other actuated device.

By reason of the fact that the direct power supply is derived from the same source as the energization of the differential transformer, the apparatus is highly insensitive to line voltage variations.

It will be evident that the differential transformer supplying signals to lines 16 and 18 may be replaced by various other devices which will give rise to alternating signals indicative of end points of a dead band, or of a single end point of a band which includes the limits of measurement. Such devices, for example, may be bridges, photoelectric assemblies or the like. Generally such devices involve a zero signal output for some measurement value with increasing outputs of opposite phases on either side thereof. The last signals, when they reach sufficient amplitude, will actuate the disclosed circuit when they drive the transistor 46 out of saturation. The reversal of phase is not significant since half waves of a chosen polarity will serve to effect operation, there being involved only a delay difference of a half cycle for operations at one end point as compared with the other, the device accordingly being insensitive to phase differences in the operating signal.

The mechanical part of the assembly as specifically shown is adapted as a standard device for association with various measuring instruments, but obviously may be built into a measuring instrument as an integral part thereof.

While it is preferred to use a transistor amplifier such as 46 which is normally in a saturated condition in the absence of an actuating signal, it will be evident that such an amplifier might normally be biased to a cut-off condition, to be driven into an operating amplifying condition by a signal of sufficient amplitude. It will be also evident that instead of having the dead band defined by signals less than a predetermined amplitude such a dead band might be defined by signals exceeding a predetermined amplitude and driving an amplifier to either saturation or cut-off, a decrease of signal amplitude causing the amplifier to enter a normal amplifying condition to provide output signals to a monostable multivibrator. In the last case the signals to the amplifier may be provided by a circuit maintained in a resonant peak within the dead band.

It will be evident that various changes in details of construction may be made without departing from the invention as defined in the following claims.

What is claimed is:

1. In combination, means providing an alternating variable amplitude input signal, an amplifier receiving said input signal and normally biased to a limit condition of operation preventing small signal amplification such that amplitude values of said input signal on one side of a predetermined value fail to produce a condition of said amplifier out of said limit condition while amplitude values of said input signal on the other side of said predetermined value produce a condition of said amplifier out of said limit condition to provide an output in the form of a series of pulses therefrom, and a separate monostable multivibrator of the type characterized by retaining its astable state for a predetermined time following triggering, which time exceeds the period of a cycle of said alternating input signal receiving pulses of said output from the amplifier and arranged to be tripped to its astable state by such output.

2. In combination, means providing an alternating variable amplitude input signal, an amplifier receiving said input signal and normally biased to a saturated condition of operation such that amplitude values of said input signal on one side of a predetermined value fail to produce a condition of said amplifier out of said saturated condition while amplitude values of said input signal on the other side of said predetermined value produce a condition of said amplifier out of said saturated condition to provide an output in the form of a series of pulses therefrom, and a separate monostable multivibrator of the type characterized by retaining its astable state for a predetermined time following triggering, which time exceeds the period of a cycle of said alternating input signal receiving pulses of said output from the amplifier and arranged to be tripped to its astable state by such output.

3. In combination, means providing an alternating variable amplitude input signal, an amplifier receiving said input signal and normally biased to a limit condition of operation preventing small signal amplification such that amplitude values of said input signal less than a predetermined value fail to produce a condition of said amplifier out of said limit condition while amplitude values of said input signal exceeding said predetermined value produce a condition of said amplifier out of said limit condition to provide an output in the form of a series of pulses therefrom, and a separate monostable multivibrator of the type characterized by retaining its astable state for a predetermined time following triggering, which time exceeds the period of a cycle of said alternating input signal receiving pulses of said output from the amplifier and arranged to be tripped to its astable state by such output.

4. In combination, means providing an alternating variable amplitude input signal varying, in its range of operation from a large value through a minimum value to a second large value, means receiving said input signal and providing an output in the form of a series of pulses only when said input signal has an amplitude exceeding, on either side of said minimum value, a predetermined value, and a monostable multivibrator of the type characterized by retaining its astable state for a predetermined time following triggering, which time exceeds the period of a cycle of said alternating input signal receiving the pulses of said output and arranged to be tripped to its astable state by such output.

References Cited by the Examiner

UNITED STATES PATENTS

| | | | |
|---|---|---|---|
| 2,901,740 | 8/1959 | Cutsogeorge | 323—22 |
| 2,947,875 | 8/1960 | Beck | 307—88.5 |
| 2,969,498 | 1/1961 | Stenudd | 323—22 |
| 2,992,340 | 7/1961 | Floyd | 307—88.5 |
| 2,992,640 | 7/1961 | Knapp | 307—88.5 |
| 3,005,963 | 10/1961 | Emile | 331—113 |
| 3,022,469 | 2/1962 | Bahrs et al. | 331—145 |
| 3,024,390 | 3/1962 | Pinckaers | 317—148.5 |
| 3,059,177 | 10/1962 | Winchel | 324—57 |
| 3,154,752 | 10/1964 | Brauer | 307—88.5 |

LLOYD McCOLLUM, *Primary Examiner.*

ROBERT L. SIMS, *Examiner.*